May 16, 1933.  B. L. BOBROFF  1,909,040
SIGNAL SWITCH CONSTRUCTION FOR AUTOMOTIVE VEHICLES
Filed May 10, 1930   2 Sheets-Sheet 1
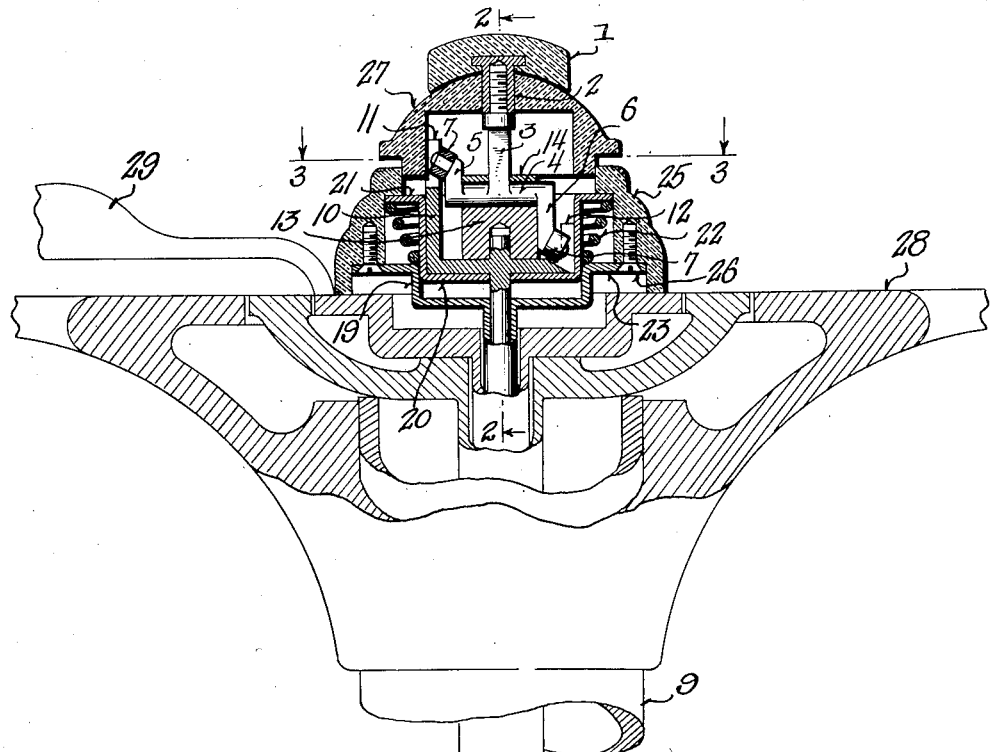
Fig. 1
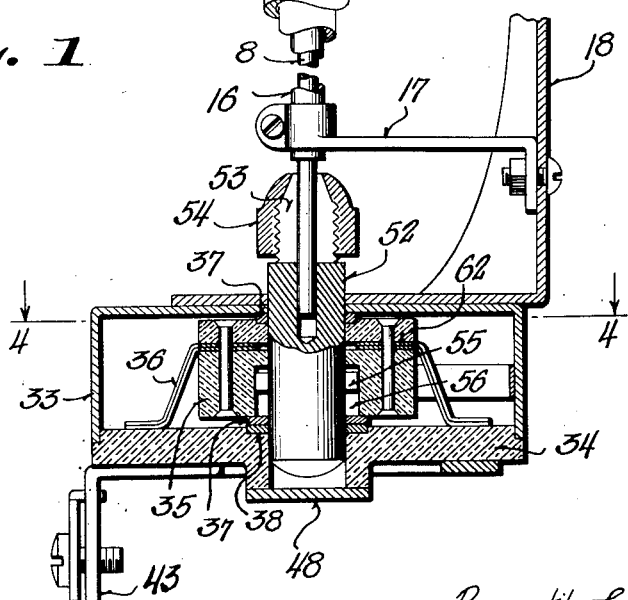
Inventor
Bornett L. Bobroff
By Arthur R. Woolfolk
Attorney May 16, 1933.    B. L. BOBROFF    1,909,040
SIGNAL SWITCH CONSTRUCTION FOR AUTOMOTIVE VEHICLES
Filed May 10, 1930    2 Sheets-Sheet 2
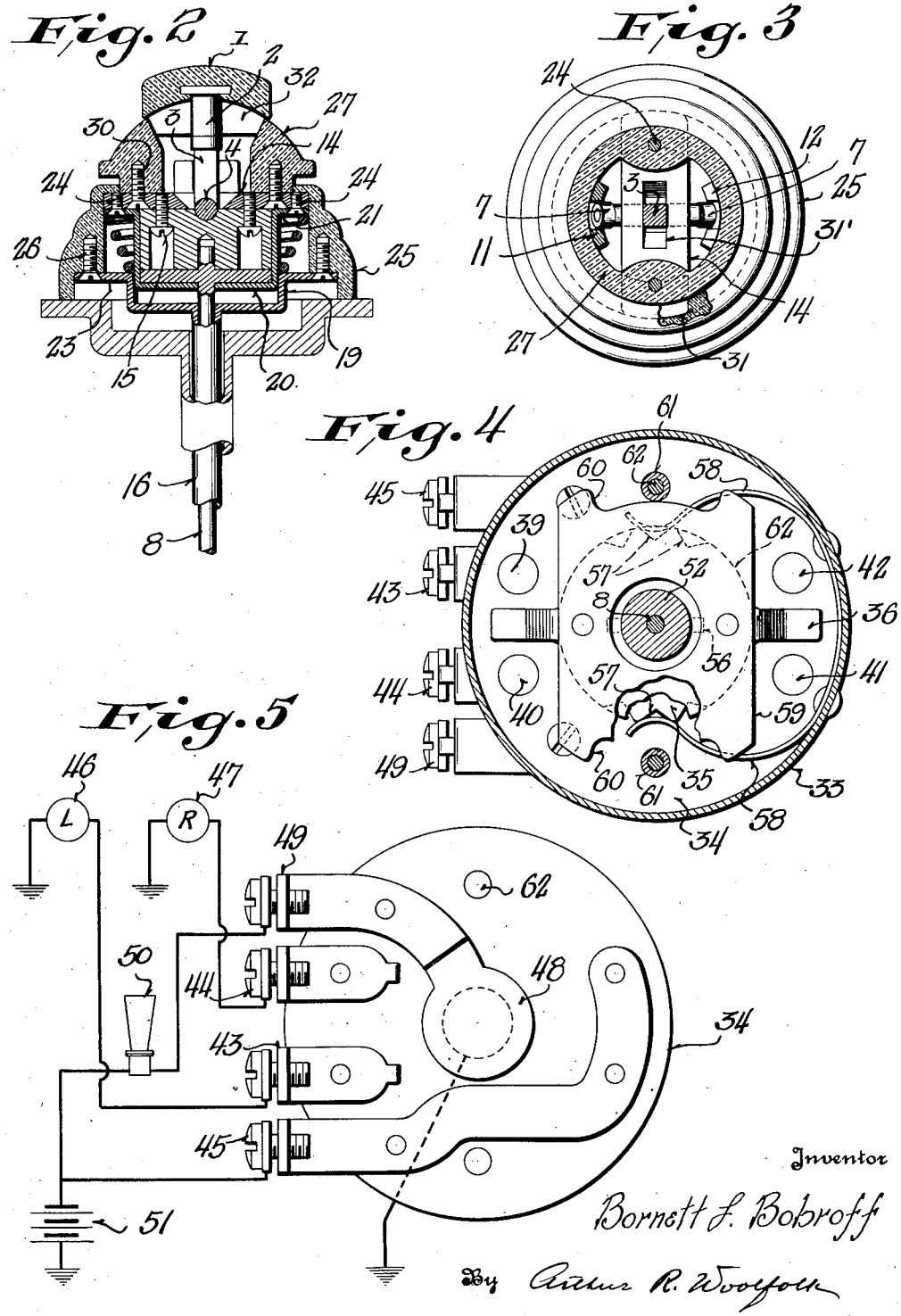

Patented May 16, 1933

1,909,040

UNITED STATES PATENT OFFICE

BORNETT L. BOBROFF, OF RACINE, WISCONSIN

SIGNAL SWITCH CONSTRUCTION FOR AUTOMOTIVE VEHICLES

Application filed May 10, 1930. Serial No. 451,254.

This invention relates to a signal switch construction for automotive vehicles.

Objects of this invention are to provide a horn button signal switch which is so constructed that the same member, or button, serves both as the horn button and signal, or direction switch button, and is so made that it is adapted to be mounted centrally of the steering wheel.

In horn buttons it has been found, from actual practice, that the wire extending through the steering column frequently breaks or has its insulation worn off due to rubbing and vibration, and it will be readily appreciated that any wire or group of wires located in the steering column is subjected to the same dangers.

This invention has for its further objects the provision of a horn button signal switch construction in which all wires are eliminated from the steering column and steering wheel, although the operating member or control member or button may be located centrally of the steering wheel and although such button controls not only the horn, but also a plurality of signalling devices.

Further objects are to provide a horn button and signal switch button which is depressible in the usual manner to sound the horn and which is bodily movable towards the intended direction of travel to operate the corresponding signalling device.

Further objects are to provide a horn and signal switch button or member which does not rotate with the hand wheel or gas or spark levers although mounted centrally of the hand wheel, and which does not disfigure the hand wheel but simulates an attractive form of horn button although possessing numerous functions as outlined above, and which is compact and free from any contacts adjacent the hand wheel or in any portion of the steering column.

Further objects are to provide a horn button and signal switch construction which is easy to assemble and is easy to accurately adjust, in which a combined horn switch and signal switch rod extends through the steering column and may be easily inserted, and in which a combination horn and signal switch proper is carried adjacent the lower end of the steering column and is easily adjusted and connected to the rod.

Further objects are to provide a construction in which the movable and stationary contacts are readily accessible although completely housed, and in which simple and readily accessible terminals are provided for the horn and signal circuits so that no wires need extend into even the housed portion of the switch.

Further objects are to provide a novel construction in which a single rod extending through the steering column is so controlled that it may be given either axial or rotary motion to selectively operate either the horn switch or signal switch, and in which novel means are provided which may be depressed to depress the rod and sound the horn, and which may be rocked laterally in either direction to rotate the rod and accordingly operate the signal switch movable contact.

An embodiment of the invention is shown in the accompanying drawings in which:—

Figure 1 is a side elevation partly broken away and partly in section showing the apparatus in assembled position.

Figure 2 is a sectional view on the line 2—2 of Figure 1.

Figure 3 is a sectional view on the line 3—3 of Figure 1.

Figure 4 is a sectional view on the line 4—4 of Figure 1.

Figure 5 is a bottom view of the device showing the wiring diagrammatically.

Referring to the drawings, it will be seen that the switch mechanism is controlled by a single member 1 located centrally of the steering column and constituting a combined horn button and signal switch member. This member may be molded bakelite and may carry a metallic shank 2, molded therein, which is screw threaded upon the upper end of a lever 3 provided with an integral, horizontal shaft 4. The shaft 4 is provided at its ends with an upwardly projecting arm 5 and a downwardly projecting arm 6 provided with angularly set rollers 7 at their ends.

A rod 8 extends through the steering column indicated generally at 9, and is provided with a rigidly attached cup shaped member 10 at its upper end. This cup shaped member is provided with slotted extensions 11 and 12 at opposite sides which receive the rollers 7. A block 13 is carried within the cup shaped member 10 and is centrally apertured and receives the upper end of the rod 8. The block is transversely grooved and forms a bearing for the horizontal shaft 4, an upper bearing member 14 being held to the block by means of screw 15, see Figure 2.

A tube 16 surrounds the rod 8 and is held rigid adjacent its lower end in any suitable manner as by means of a clamping arm 17 carried by a bracket 18, such bracket being secured to a side frame bar, not shown, or other relatively stationary portion of the automotive vehicle. The upper end of the tube 16 rigidly carries a guiding cup 19 within which a cup shaped sleeve member 20 is loosely guided. The member 20 is provided with a flange 21 at its upper end and a spring 22 is positioned between the flange 21 and a flange 23 formed on the member 19. The upper bearing member 14 is secured by means of screws 24 to the flange 21, see Figure 2.

A bakelite sleeve 25 is rigidly secured to the flanges 23 by means of screws 26, see Figure 1, and guides a top or cap 27 also formed of bakelite. The sleeve 25 is thus prevented from turning with the steering wheel 28 or with the spark or gas lever 29, as it is secured to the rigidly mounted tube 16.

The top or cap 27 is secured by means of screws 30 to the upper bearing member 14, see Figure 2. This bearing member 14 is a transversely extending bar slotted as indicated at 31', Figure 3, for the passage there through of the lever 3. The member 14 has its ends slidably seated in keyways 31 formed in the sleeve 25, see Figure 3, and is thus prevented from turning, thereby preventing the cap 27 from turning, but allowing the button 1 and the cap 27 to be depressed to sound the horn in a manner hereinafter described.

The cap 27 is transversely slotted as indicated at 32 in Figure 2 to allow the button 1 together with the lever 3 to be moved to the right or left to give a direction signal in a manner hereinafter described.

From the description thus far given, it is clear that when the button 1 is depressed, the cap 27 and, through the associated parts, the rod 8 is depressed. When the button 1 is rocked to the right or left, the rollers 7 rotate the cup 10 in one or the other direction and consequently rotate the rod 8 in a similar manner. The button 1 is thus a combined horn button and signal switch button and is used to selectively depress or rotate the rod in one or the other direction.

In as much as the cap 27 is held against rotation, it is clear that the button is always correctly positioned irrespective of the rotation of the hand wheel or the adjustment of either spark or gas lever, and consequently, the button may always be rocked directly to the right or to the left, towards the direction it is contemplated turning the automotive vehicle to thereby give the appropriate signal, as will be described later.

The lower portion of the apparatus comprises a signal switch proper and a horn switch each selectively operated by the single rod 8. It is to be particularly noted, at this point, that no wires extend through the steering column,—in reality, no wires even enter a portion of the steering column.

A signal switch housing 33 is secured to the bracket 18 and carries an insulating base 34, see Figure 1. Within this housing a rotary signal switch element, composed of the insulating hub 35 and the rotary contact arm 36, is positioned, spacers 37 being provided at opposite sides of the hub 35 to minimize friction, and preferably an extra bearing washer 38 being provided below the bottom spacer 37.

Contacts 39, 40, 41, and 42 are carried by the insulating base and are connected to terminals 43, 44, and 45,—the contacts 39 and 40 being respectively connected to the terminals 43 and 44, and both contacts 41 and 42 being connected to the terminal 45. The terminals 43 and 44 are respectively connected to the signal devices 46 and 47, which are the left and right direction signal devices or groups of devices, such as signal lamps, for instance. A center contact, or horn contact 48 is provided, see Figure 1, and is connected to the terminal 49, see Figure 5, which is connected to the horn 50. The other side of each signal device 46 and 47 is grounded and the horn is connected to one side of the battery 51, the other side of the battery being grounded. The battery is also connected to the terminal 45.

It is apparent that when the button 1 is rocked to the right or to the left, that the rod 8 is correspondingly rotated and the movable rotary contact 36 bridges the contacts 40 and 42, or the contacts 41 and 39, and thus respectively causes the right or left signal device or devices to be illuminated.

A slidable contact member or plunger 52 is adjustably clamped to the rod 8 by means of the split jaws 53 and clamping nut 54, as shown in Figure 1, and is adapted to engage the center or horn contact 48 when the rod 8 is depressed. The horn 50 is sounded, under these conditions, as the slidable contact 52 is grounded through the metal parts of the apparatus and thus completes the horn circuit.

Rotary motion from the rod 8 is communicated to the slidable contact member 52 and to the rotary contact member, as the member 52 is provided with a transverse bar 55, see Figure 1, which slides in keyways 56 formed in the hub 35 of the rotary contact member.

Preferably the hub 36, see Figure 1, is provided with a plurality of notches 57, see Figure 4, on opposite sides, into any pair of which the arms of a U-shaped spring 58 are adapted to snap, to thus yieldingly hold the rotary contact 36 in neutral or in either right signal or left signal displaying position. This construction, through the connecting rod 8 and associated parts, provides three definite positions in which the button 1 is temporarily and yieldingly held, as is apparent from the preceding description.

It is also preferable to provide an insulating member 59 on the upper side of the insulating hub 36, see Figure 4. This member 59 is provided with ears 60 which are adapted to contact with stops, in the form of spacers 61 which surround the bolts or rivets 62 which secure the base 34 to the housing 33, and thus provide definite limits beyond which the hub cannot be rotated.

This construction permits the secure attachment of the rotary contact member 36 to the hub. As may be seen from Figures 1 and 2, the contact 36 is provided with an annular central portion 62 which is clamped between the hub 35 and member 59.

It will be seen that no wires pass through or into the steering post, although both a signal switch and horn switch are controlled from a single combined horn button and signal switch button located at the upper end of the steering column and centrally of the steering wheel.

It will be noted that the sleeve 25 forms a casing for the combined horn button and signal switch button and that such casing is rigidly held against turning by the tube 16 and holds the combined horn button and signal switch button against turning.

It will be seen that the combined horn button and signal switch button may be depressed to sound the horn or may be rocked to the right or left to display the right or left direction indicating signals. It is to be understood, that preferably a signal device is located on each side and at the rear of the automotive vehicle and that each signal device is designed to independently give any one of a plurality of complete signals, although the specific form of signal devices employed may be varied, the showing in Figure 5 being diagrammatic and showing generally the arrangement for one signal device.

It will be seen further, that the device is simple, rugged, substantially fool proof, and is not likely to get out of order. It is easy to assemble and is free from danger of short circuiting as no wires are passed through the steering column, the rod 8 and tube 16 being freely slipped into place during assembly, and the adjustment at the lower end of the apparatus for any particular type of steering column being readily made.

It is to be understood that the term "rod" used in the claims is intended to cover either a solid rod, a tube, or any other elongated member of this general type.

Although the invention has been described in considerable detail, it is intended that such description be interpreted as illustrative rather than limiting, as the invention may be variously embodied and is to be interpreted as claimed.

I claim:—

1. In a device of the class described, the combination of a rotary switch element, contacts cooperating with said rotary switch element, a slidable switch element associated with said rotary switch element, a contact cooperating with said slidable switch element, a rotatable and depressible rod for selectively operating said rotatable and said slidable switch elements, and laterally rockable and bodily depressible means for rotating or depressing said rod.

2. In a device of the class described, the combination of a rotatable switch element, contacts cooperating with said rotatable switch element, a slidable switch element, a contact cooperating with said slidable switch element, said slidable switch element being slidable through said rotatable switch element and operatively connected to said rotatable switch element for rotating said rotatable switch element, and rocking means for selectively rotating and depressing said slidable switch element.

3. In a device of the class described, the combination of a rotatable switch element, contacts cooperating with said rotatable switch element, a slidable switch element, contacts cooperating with said slidable switch element, said slidable switch element being slidable through said rotatable switch element and operatively connected to said rotatable switch element for rotating said rotatable switch element, and a laterally rockable and bodily depressible member for selectively rotating and depressing said slidable switch element.

4. In a device of the class described, a switch having rotary movable contacts, stationary contacts cooperating with said rotary contacts, a rotary and depressible member for rotating said rotary contacts, a stationary contact adapted for engagement by said depressible member when said depressible member is depressed, a rod extending upwardly from said rotary and depressible member, a tube surrounding and carrying said rod, means for supporting said tube, a lever mounted above the upper end of said rod and adapted to be rocked forwardly or rearwardly, cam means connecting said lever and said rod, whereby lateral rocking motion of said lever is translated into rotary motion of said rod, and means pivotally supporting said lever and connected to said rod, whereby bodily depression of said lever will bodily depress said rod.

5. In a device of the class described, the combination of an insulating block mounted for rotation, movable contacts carried by said insulating block, stationary contacts arranged in the path of said movable contacts, a metallic member slidable with respect to said insulating member and adapted to transmit rotary motion to said insulating member, a contact arranged in the path of movement of said slidable member, a rod connected to and extending upwardly from said slidable member, a lever pivotally supported from said rod, whereby depression of said lever will depress said rod, and cam mechanism connecting said lever and said rod to impart rotary motion to said rod when said lever is rocked, a supporting tube surrounding said rod, and means adjacent the lower portion of said tube for supporting said tube.

In testimony whereof, the signature of the inventor is affixed hereto.

BORNETT L. BOBROFF.